May 30, 1967  L. R. HEISS  3,322,958
PHOTOMETER AUTOMATIC SAMPLE CHANGER
Filed May 7, 1964  3 Sheets-Sheet 3
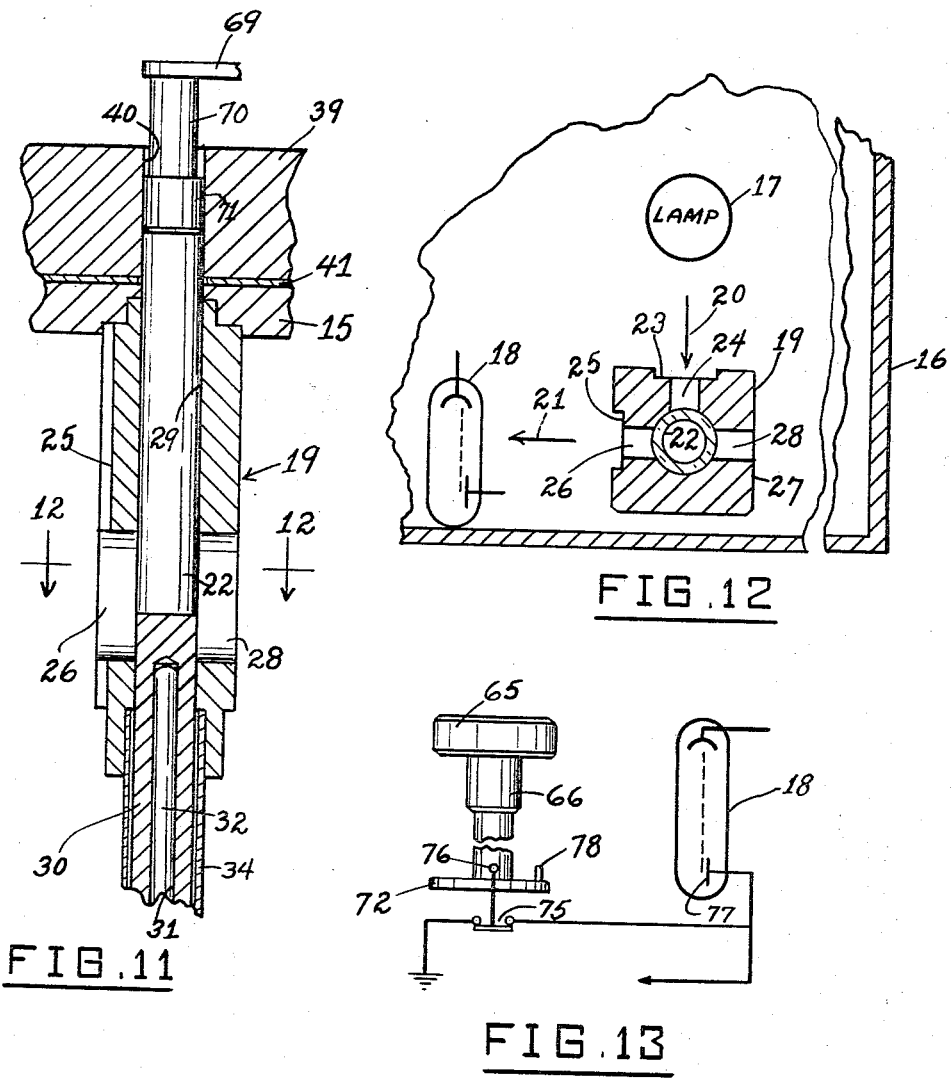
INVENTOR
LOUIS R. HEISS
BY Herman L. Gordon
ATTORNEY

United States Patent Office 3,322,958
Patented May 30, 1967

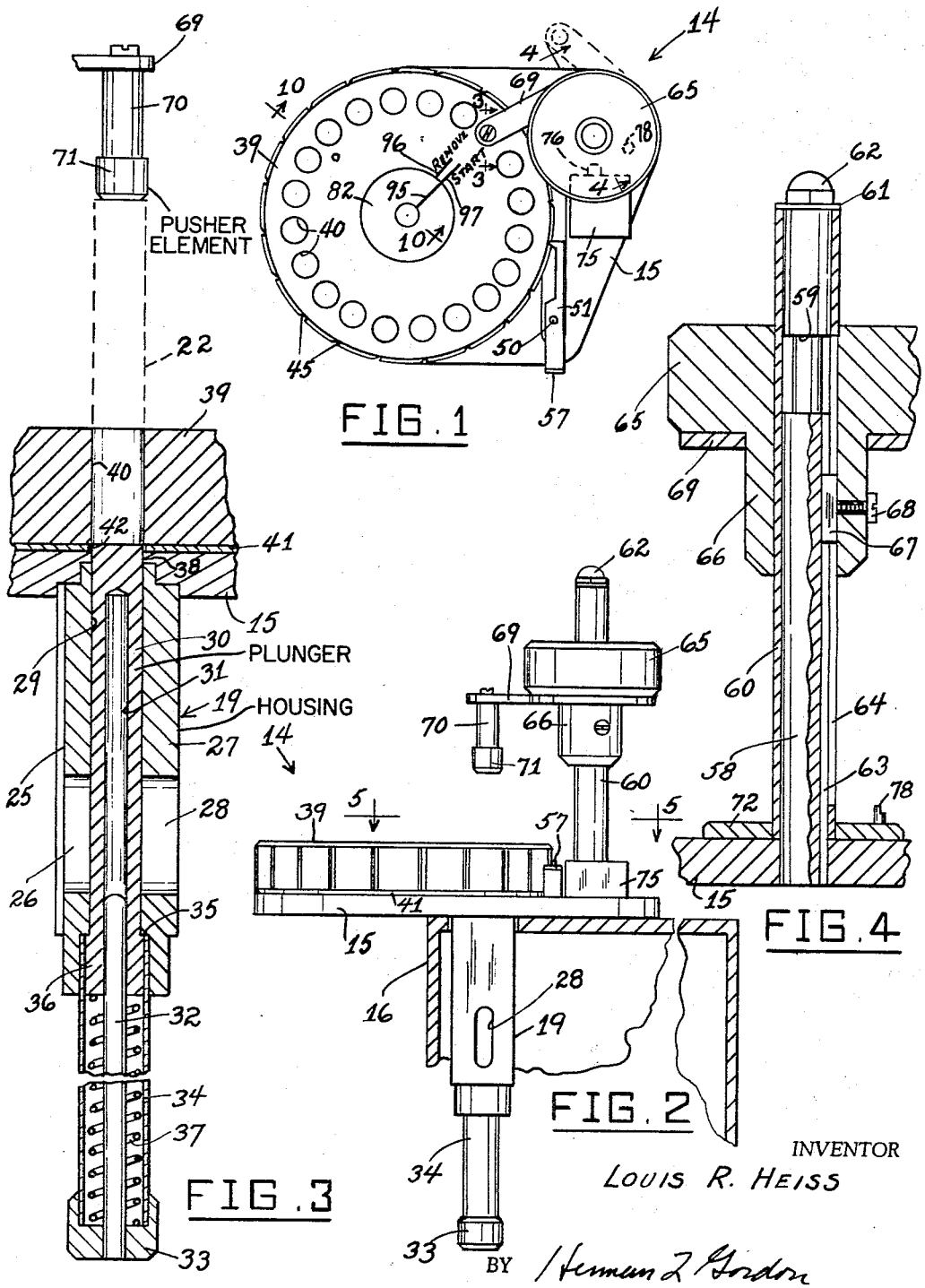

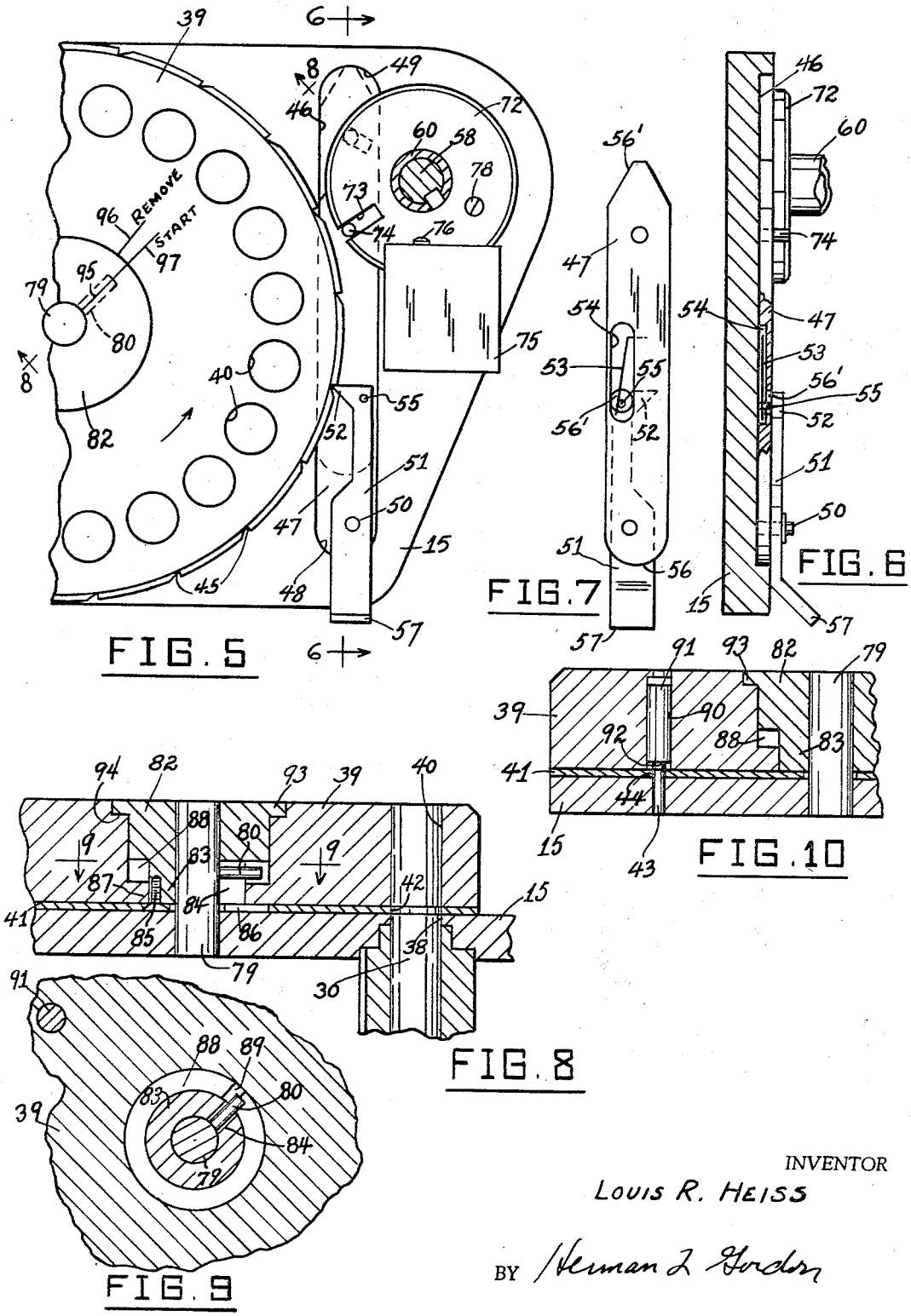

3,322,958
PHOTOMETER AUTOMATIC SAMPLE CHANGER
Louis R. Heiss, Silver Spring, Md., assignor to American Instrument Company, Inc., Silver Spring, Md.
Filed May 7, 1964, Ser. No. 365,585
15 Claims. (Cl. 250—218)

This invention relates to photometer attachments, and more particularly to a device for rapidly examining a large number of samples in a photometer of the photoelectric type.

A main object of the invention is to provide a novel and improved sample supporting and changing device for use with a photometer of the photoelectric type to enable a large number of samples to be examined in a rapid and accurately reproducible manner, said device being relatively simple in construction, being easy to operate, and automatically placing the samples in the proper position to receive radiation and to be photoelectrically examined.

A further object of the invention is to provide an improved automatic sample changer for a photofluorometer, said sample changer being compact in size, being rugged in construction, and being adapted to receive a large number of samples, to expose the samples sequentially to exciting radiation, and to direct the resultant fluorescence to the photo-sensitive receiving member of the fluorometer, each sample being exposed to radiation and its resultant fluorescence being detected under exactly the same conditions, whereby operating errors are reduced to a minimum.

A still further object of the invention is to provide an improved sample holder and sample changer for a photofluorometer or other photometer of the photoelectric type, the apparatus being relatively inexpensive to manufacture, involving relatively few parts, and having a sample supporting turret which is easy to remove and replace, enabling successive batches of samples to be rapidly and efficiently examined.

A still further object of the invention is to provide an improved automatic sample changer for a photoelectric photometer having means for automatically obtaining a reading of dark current prior to the examination of each sample.

A still further object of the invention is to provide an improved automatic sample changer for a photoelectric fluorometer having a turret arranged to serve as a rack for a large number of samples to be examined, said turret being easy to mount on the sample changer when the samples are to be examined and having means to insure proper indexing of the samples relative to the operating mechanism of the device.

These objects are accomplished by providing a sample changing attachment for a photometer of the type including an enclosure containing a lamp and a photocell. The enclosure has a top wall with an opening. The sample changing attachment consists of a base with a depending housing extending through said opening. A turret is rotatably mounted on the base and has circularly arranged peripheral sample openings registrable with the depending housing. The depending housing is located in the optical path between the lamp and the photocell and has a light-admitting aperture facing the lamp and another aperture facing the photocell. A vertical post is mounted on the base and is surrounded by a rotatable sleeve. A knob is splined to the sleeve and a horizontal arm is secured to the knob. The arm has a depending pusher rod registrable with the depending housing. The sleeve has a bottom flange with a slot which is drivingly engaged with an upstanding pin on a ratchet bar cooperating with peripheral notches on the turret to rotate the turret stepwise responsive to rotation of the knob. The depending housing has a plunger biased upwardly by a spring to normally close off the apertures. A sample in a turret opening registering with the housing can be pushed downwardly, responsive to depression of the knob, by the pusher rod into the housing against the plunger to move the sample into the optical path between said apertures. The top end of the plunger is normally beneath the plane of the turret to allow the turret to be rotated.

Further objects and advantages of the invention will become apparent from the following description and claims, and from the accompanying drawings, wherein:

FIGURE 1 is a top plan view of an improved sample changer constructed in accordance with the present invention.

FIGURE 2 is a front elevational view of the automatic sample changer of FIGURE 1, with the sample-depressing element thereof shown in partly lowered position, the sample changer being mounted on a photometer, shown in fragmentary vertical cross-section.

FIGURE 3 is an enlarged fragmentary vertical cross-sectional view taken substantially on the line 3—3 of FIGURE 1, with the sample-depressing element thereof shown at the top of its operating stroke.

FIGURE 4 is an enlarged fragmentary vertical cross-sectional view taken substantially on the line 4—4 of FIGURE 1.

FIGURE 5 is an enlarged fragmentary horizontal cross-sectional view taken substantially on the line 5—5 of FIGURE 2.

FIGURE 6 is a vertical cross-sectional view taken substantially on the line 6—6 of FIGURE 5.

FIGURE 7 is a bottom view of the slide and pawl assembly of the sample changer of FIGURES 1 to 6.

FIGURE 8 is a fragmentary vertical cross-sectional view taken substantially on the line 8—8 of FIGURE 5.

FIGURE 9 is a fragmentary horizontal cross-sectional view taken substantially on the line 9—9 of FIGURE 8.

FIGURE 10 is an enlarged fragmentary vertical cross-sectional view taken substantially on the line 10—10 of FIGURE 1.

FIGURE 11 is a fragmentary vertical cross-sectional view similar to FIGURE 3 but showing a sample depressed to a position for examination in the associated photofluorometer.

FIGURE 12 is a horizontal cross-sectional view taken substantially on the line 12—12 of FIGURE 11, showing diagrammatically the positions of the associated radiation source and photo-sensitive detection element.

FIGURE 13 is a fragmentary wiring diagram showing the relationship of the grounding switch for the photomultiplier tube of the photofluorometer and the operating member of the sample changer and indicating how the switch is operated by said member to remove the ground at times during operation of the sample changer.

Referring to the drawings, 14 generally designates an improved sample changing apparatus constructed in accordance with the present invention. The apparatus 14 comprises a horizontal base member 15 adapted to be mounted on the top wall of a conventional photoelectric photometer, such as a photo-fluorometer 16 of the type including a source of radiation 17, such as a lamp, and a photo-sensitive receiver, such as a photomultiplier tube 18. Rigidly secured to and depending from the base member 15 is a sample exposure housing 19 which is supported in the photo-fluorometer in a position to receive incident radiation 20 from the source 17 and is located in a position to emit fluorescent radiation 21 in a direction normal to the direction of the incident radiation and to direct the fluorescent radiation toward the photo-sensitive device 18.

As will be presently explained, the housing 19 is arranged to receive a transparent tubular sample cell 22, the wall 23 of the housing facing source 17 being formed with an aperture 24 to admit radiation from said source, and being formed in another wall 25 at right angles to the wall 23 with the aperture 26 to transmit fluorescent radiation from the material in cell 22 toward the photosensitive device 18.

The wall 27 opposite wall 25 is also formed with an aperture 28 aligned with aperture 26 to enable the sample changing apparatus to be employed for radiation transmission in conjunction with colorimetry or turbidimetry measurements.

Slidably mounted in the bore 29 of housing 19 is a hollow plunger 30, said plunger having a central bore 31 which slidably receives a vertical guide pin 32, centrally secured to a cap member 33 secured on the bottom end of a cylindrical casing 34 rigidly secured to and depending axially from housing 19. The casing 34 has an internal diameter somewhat larger than that of the bore 29 and the bottom end of bore 29 is correspondingly enlarged, defining an annular stop shoulder 35. Plunger 30 is provided with an enlarged bottom end portion 36 which is biased toward engagement with shoulder 35 by a coiled spring 37 surrounding pin 32 and bearing between cap 33 and portion 36. As shown in FIGURES 1 and 11, base 15 is formed with an aperture 38 registering with the bore 29, and the top end of plunger 30 normally is disposed in said aperture.

A circular turret 39 is rotatably and detachably mounted on base 15 in a manner presently to be described, said turret being formed with a number of evenly spaced circularly arranged sample-receiving apertures 40 which are selectively registrable with the aperture 38. The turret 39 is provided with a rotatable bottom cover disc 41 having a single sample-receiving aperture 42 which is locked in registration with aperture 38 when the turret is mounted on base 15 by the engagement of an upstanding pin 43, rigidly secured in base 15, in a locking aperture 44 provided in disc 41, as shown in FIGURE 10, and as will be presently described. The top end of pin 43 is substantially flush with the top surface of disc 41, in the operating position of the turret assembly.

The peripheral edge of the turret 39 is formed with uniformly spaced drive notches or grooves 45 corresponding in number with the sample-receiving apertures 40. The base 15 is formed subjacent a peripheral portion of the turret with a transversely extending slide groove 46 in which is slidably mounted a slide bar 47 movable rectilinearly in the groove 46 and limited in movement by the engagement of its opposite ends with the opposite ends 48 and 49 of the groove. Pivoted to the slide bar 47 at 50 is a pawl member 51 having a tapered laterally extending inner tip 52 drivingly engageable with the notches 45 and biased toward such engagement, namely, in a counterclockwise direction, as viewed in FIGURE 5, by a wire spring 53 (see FIGURES 6 and 7). Slide bar 47 is formed with a longitudinal bottom recess 54, one end of spring 53 being anchored in a side wall of said recess. The free end portion of the spring engages a pin 55 secured in the pawl tip 52 and depending through an aperture 56' provided in bar 47, whereby the spring 53 urges the tip 52 toward the right, as viewed in FIGURE 7, namely, in a counterclockwise direction, as viewed in FIGURE 5.

The turret notches 45 are asymmetrically V-shaped, as shown in FIGURE 5, so as to allow the tip 52 to readily disengage from a notch without rotating the turret when the slide bar 47 is moved forwardly to the position shown in FIGURE 5. When the slide bar 47 is moved to bring its end 56 substantially into engagement with the end 48 of groove 46, the tip enters the next adjacent notch 45 in driving relation thereto with respect to a subsequent rearward movement of the slide bar. Thus, the turret 39 is rotated through a step corresponding to the circumferential angle between adjacent apertures 40 when the slide bar 47 is moved rearwardly from the position of FIGURE 5, namely, is moved substantially into abutment with the rear end 49 of groove 46.

Pawl member 51 is provided at its forward end with a gripping lug 57 to allow the pawl member to be at times manually disengaged from the periphery of the turret, for example, when the turret is installed or removed.

Rigidly secured in base 15 adjacent groove 46 is an upstanding post member 58 formed at its upper portion with a wide annular groove 59. Rotatably mounted on said post member is a sleeve 60, substantially coextensive in height therewith and retained thereon by a washer 61 and a cap screw 62 provided on the top end of the post member. The portion of post member 58 below groove 59 is formed with a groove or keyway 63, and the sleeve 60 is formed with a longitudinal slot 64 registrable with said keyway and extending to the top end of groove 59, as shown in FIGURE 4. A knob 65 having a depending collar portion 66 is slidably mounted on sleeve 60 and is splined to the sleeve by a block element 67 secured in collar portion 66 by a fastening screw 68. Block element 67 is slidable in both slot 64 and keyway 63 but is receivable in the groove 59 when the knob 65 is elevated to allow the knob 65 and sleeve 60 to be rotated as a unit on the post member 58.

Secured rigidly around the collar portion 66 beneath the knob 65 is an arm 69 having a depending pusher rod 70 rigidly secured to its outer end. A pusher head 71 is secured on the bottom end of rod 70, said head being slightly smaller in diameter than the turret apertures 40 and being slidably engageable therein, as shown in FIGURE 11.

Rigidly secured to the lower end of sleeve 60 is a flange 72 formed with a radial slot 73 receiving an upstanding drive pin 74 provided on slide bar 47. Thus, the slide bar is moved responsive to rotation of the knob 65. However, such rotation can occur only when the knob is elevated to a position wherein the block 67 can rotate in the groove 59. When the block 67 is in a position such as that illustrated in FIGURE 4, namely, is in slot 64 and keyway 63, the knob is held against rotation, and the arm 69 is held in a position wherein pusher rod 70 is in vertical alignment with the apertures 38 and 42, and with a turret aperture 40 in registration therewith.

With the parts in the position of FIGURE 4, downward movement of the knob 65 causes pusher head 71 to exert downward force on the top end of a sample tube 22 and to move the tube 22 downwardly to the position of FIGURES 11 and 12, wherein the tube is exposed to radiation from the lamp 17 through the slot 24, and wherein fluorescence from the material in the tube can emerge through the slot 26 and impinge on the photomultiplier tube 18. Upon release of the knob, spring 37 elevates plunger 30 to the position of FIGURE 3, whereby the sample tube 22 lifts arm 69 and knob 65. The knob may then be elevated manually to a height sufficient to register block 67 with groove 59. Knob 65 is then rotated, first clockwise, as viewed in FIGURE 1, until the rear end 56' of the slide bar engages the rear end 49 of groove 46, and then counterclockwise to return the slide bar to the position of FIGURE 5, wherein the forward end 56 of the slide bar abuts the forward end 48 of groove 46. This steps the turret 39 counterclockwise, as viewed in FIGURES 1 and 5, through an angle sufficient to bring the next sample tube 22 into registry with the apertures 42 and 38, allowing said next sample tube to be depressed to the position of FIGURE 11.

Mounted on base 15 adjacent and slightly above flange 72 is a normally closed microswitch 75 having an operating plunger 76 which is engageable by the collar member 66, to open the switch, when the knob 65 is depressed to bring the sample tube to the position of FIGURE 11.

As shown in FIGURE 13, microswitch 75 is connected in a circuit to normally ground the anode 77 of the photomultiplier tube 18, to prevent any response thereof, and to minimize the risk of damage to the tube. The grounding circuit is opened when collar element 66 engages operating plunger 76 to open the switch, allowing the photomultiplier tube to respond to the fluorescent emission. Microswitch 75 is also opened responsive to the above-mentioned clockwise rotation of knob 65 by the provision of an upstanding switch-actuating pin 78 on flange 72 which engages plunger 76 substantially as the rear end 56' of slide bar 47 comes into abutment with the rear end 49 of groove 46. This provides a reading of dark current with each change of sample tube.

Base member 15 is provided with an upstanding turret post member 79 rigidly secured thereto. Rigidly secured to the intermediate portion of post member 79 is a radially projecting locking pin 80. Turret 39 is provided with a rotatable flanged hub 82 which is in turn engageable on the post member 79, said hub having a reduced lower end portion 83 provided with a radial slot 84 adapted to receive the pin 80 to lock the hub against rotation relative to base member 15. The disc 41 is rigidly secured to hub portion 83 by fastening screws 85, said disc being formed with a radial slot 86 extending from its central aperture and aligned with slot 84 to provide clearance for pin 80 when the turret assembly is mounted on the post member 79. As shown in FIGURE 8, the turret 39 has an inwardly projecting annular central flange 87 rotatably engaging the reduced hub portion 83 and located below the level of the pin 80, defining an annular clearance space 88 for said pin. Flange 87 is formed with a radial notch 89 (see FIGURE 9) which may be aligned with slots 84 and 86 to permit the turret assembly to be mounted on the post member 79. After the turret assembly is mounted on the post member, rotation of the turret 39 relative to the hub 82 moves the notch 89 out of registry with slots 84 and 86, causing the turret assembly to be retained on the post member 79.

As shown in FIGURE 10, the turret 39 is formed with a cylindrical vertical recess 90 in which is slidably positioned a locking pin 91 having a reduced axial bottom stud 92 located to engage in the indexing aperture 44 of disc 41 when the slot 86 is in registry with the notch 89. Thus, the turret 39 is initially locked relative to disc 41 by allowing stud 92 to drop into aperture 44. In this position, the cell aperture 42 of the disc is halfway between two adjacent cell apertures 40 of the turret. The turret assembly is then engaged on the post member 79, the pawl member 51 being manually held in a clockwise rotated position, as viewed in FIGURE 5, by means of lug 57, to provide clearance between tip 52 and the periphery of the turret.

When the turret is thus mounted on the post member, the cell aperture 42 of the disc is in registry with and receives the top end of the plunger 30. In this position, the upstanding pin 43 of base member 15 elevates the locking pin 91 to thereafter allow the turret to be rotated relative to disc 41.

Hub 82 has a top flange 93 rotatably received in an annular seat 94 provided centrally in the turret 39. The top surface of hub 82 is inscribed with a radial index line 95, and the adjacent surface of turret 39 is inscribed with a radial mark 96 which is aligned with line 95 when slots 84 and 86 are in registry with notch 89. The turret surface is further inscribed with a radial mark 97, which, when aligned with index mark 95, places the first cell aperture 40 of the turret in registry with plunger 30.

Prior to mounting a turret assembly containing a batch of sample tubes on the base 15, the knob 65 is elevated and rotated clockwise as far as it will go, namely, to bring the rear end 56' of slide bar 47 into abutment with the rear end 49 of groove 46. This moves the arm 69 rearwardly to a non-interfering position, shown in dotted view in FIGURE 1. This also provides a dark current reading by the coaction of pin 78 with microswitch plunger 76.

The turret assembly is then mounted on the post member 79 in the manner above described (the aperture 42 of disc member 41 being out of registry with any of the turret apertures 40 and the disc member being initially locked relative to the turret by the stud 92). In this position, the "Remove" line 96 is in registry with the index line 95. The turret is released by the above-described action of pin 43 and is then manually rotated counterclockwise (pawl tip 52 being held away from the turret periphery) to register the "Start" line 97 with the index line 95. Pawl member 51 is then released and knob 65 is rotated counterclockwise, as viewed in FIGURE 1, as far as it will go. This registers pusher head 71 with the top of the first sample cell and also brings block 67 into registry with keyway 63. Knob 65 is then depressed as far as it will go. This pushes the sample cell into the position of FIGURE 11, and simultaneously activates the photomultiplier tube 18 by removing the ground from its anode 77 by means of the coaction of collar 66 with microswitch 75. The cell is thus exposed to the excitation beam from lamp 17 and the resultant fluorescent response may then be sensed by the photomultiplier tube, whereby a reading may be taken. Knob 65 is then released and is elevated by the action of spring 37. The knob may then be elevated to its upper limiting position wherein block 67 may enter groove 59, and knob 65 is then rotated clockwise as far as it will go. This simultaneously advances the turret through one step for the next sample reading and again gives a dark current reading by the coaction of pin 78 with microswitch plunger 76.

The process may be repeated until all the samples have been examined, after which the turret assembly may be removed (by registering line 96 with line 95), and replaced by the next turret assembly containing the next batch of samples to be examined.

While a specific embodiment of an improved automatic sample changer for a photometer has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a photometer having a source of radiation and a photosensitive receiver, a sample changer mounted on the photometer, said sample changer comprising a base, a housing depending from said base and having respective exposure apertures facing said source and receiver, a plunger member in said housing, means biasing said plunger member upwardly to a position covering said apertures, a turret rotatably mounted on said base and having a plurality of sample tube-receiving openings selectively registrable with said plunger member, an upstanding support on said base, an arm slidably and rotatably mounted on said support, a depending pusher element on said arm registrable with said plunger member in a first position of said arm and being engageable with a sample tube registering with said plunger member to move the sample tube downwardly adjacent said exposure apertures responsive to depression of said arm, and means to rotate said turret stepwise responsive to rotation of said arm between said first position thereof and a second position thereof.

2. In a photometer having a source of radiation and a photosensitive receiver, a sample changer mounted on the photometer, said sample changer comprising a base, a housing secured to and depending from said base, said housing having a vertical bore and being formed with respective exposure apertures facing said source and receiver, a plunger member slidably mounted in said bore, means biasing said plunger member upwardly to a position covering said exposure apertures, a turret rotatably mounted on said base and having uniformly spaced circularly arranged sample tube-receiving apertures selectively registrable with said bore, an upstanding support on said base, an arm slidably and rotatably mounted on said support, a depending pusher element on said arm registrable with said bore in a first position of the arm, said pusher element being engageable with a sample tube positioned over said plunger member to move the sample tube adjacent said exposure apertures responsive to depression of said arm, said arm being rotatable to a second position, and means to rotate the turret through an angle corresponding to the angular spacing between adjacent sample tube-receiving apertures responsive to rotation of said arm between said two positions thereof.

3. The structure of claim 2, and means preventing rotation of the arm relative to said support unless the arm is at a predetermined elevation on the support.

4. The structure of claim 3, and wherein the support comprises an upstanding post member formed with a keyway and with an annular groove at the top of said keyway, and wherein the means preventing rotation of the arm comprises a block element secured to the arm and engaged in said keyway, said block element being receivable in said annular groove to allow rotation of the arm relative to the post member.

5. The structure of claim 2, and a control switch mounted on the base adjacent said arm, said control switch being connected in circuit with the photosensitive receiver and normally maintaining the receiver inactive, and means secured to said arm operatively engageable with said control switch to activate the receiver responsive to said depression of the arm.

6. The structure of claim 5, and further means secured to said arm operatively engageable with said control switch to activate the receiver responsive to the rotation of said arm substantially to said second position, whereby to measure the dark current of the receiver.

7. The structure of claim 2, and wherein said base is provided with an upstanding turret of post and the turret is provided with a rotatable hub member detachably secured on said turret post.

8. The structure of claim 7, and a disc member secured to said hub member and underlying the turret, said disc member being formed with a sample tube aperture registrable with said vertical housing bore.

9. The structure of claim 8, and wherein said turret post is provided with a radially extending locking pin, and wherein said hub member is formed with a radial notch receiving said locking pin, said turret having an inwardly extending annular bottom flange having a notch through which the locking pin is at times engageable to allow said bottom flange to be received thereunder.

10. The structure of claim 9, and wherein said disc member is formed with a radial slot registering with said radial notch.

11. The structure of claim 8, and wherein said disc member is formed with an indexing hole and the turret is provided with a vertically movable stud element engageable in said indexing hole when the sample tube aperture of the disc member is substantially midway between two adjacent sample tube-receiving apertures of the turret.

12. The structure of claim 11, and an upstanding release pin on said base engageable in said indexing hole when the sample tube aperture of the disc member registers with said vertical housing bore.

13. In a photometer having a source of radiation and a photosensitive receiver, a sample changer mounted on the photometer, said sample changer comprising a base, a housing secured to and depending from said base, said housing having a vertical bore and being formed with respective exposure apertures facing said source and receiver, a plunger member slidably mounted in said bore, means biasing said plunger member upwardly to a position covering said exposure apertures, a turret rotatably mounted on said base and having uniformly spaced circularly arranged sample tube-receiving apertures selectively registrable with said bore, an upstanding support on said base, an arm slidably and rotatably mounted on said support, a depending pusher element on said arm registrable with said bore in a first position of the arm, said pusher element being engageable with a sample tube positioned over said plunger member to move the sample tube adjacent said exposure apertures responsive to depression of said arm, said arm being rotatable to a second position, a bar member slidably mounted on the base adjacent a peripheral portion of the turret, a pawl pivoted on said bar member, means biasing said pawl into driving engagement with said peripheral portion, and means to move said bar member rectilinearly responsive to rotation of said arm between said two positions through a distance sufficient to rotate the turret through an angle corresponding to the angular spacing between successive sample tube-receiving apertures.

14. The structure of claim 13 and wherein the base is provided with a guide groove receiving said bar member and having opposite end walls, and wherein said first and second positions are defined by the engagement of the respective ends of the bar member with said end walls.

15. The structure of claim 14, and wherein the means to move the bar member rectilinearly comprises a flange element rigidly connected to said arm and overlying said bar member, said flange element being formed with a drive slot, and an upstanding pin element on said bar member extending into said drive slot.

References Cited

UNITED STATES PATENTS 3,163,756  12/1964  Meeder et al. _____ 250—106

OTHER REFERENCES

Cohn et al.: "Automatic Sample Changer," International Journal of Applied Radiation and Isotopes, vol. 4, pp. 118 to 121; Dec. 1958.

RALPH G. NILSON, *Primary Examiner.*

J. D. WALL, *Assistant Examiner.*